(12) United States Patent
Kaneko et al.

(10) Patent No.: US 10,373,633 B2
(45) Date of Patent: Aug. 6, 2019

(54) MAGNETIC TAPE DEVICE AND HEAD TRACKING SERVO METHOD

(71) Applicant: FUJIFILM Corporation, Tokyo (JP)

(72) Inventors: Tetsuya Kaneko, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/854,438

(22) Filed: Dec. 26, 2017

(65) Prior Publication Data
US 2018/0182417 A1    Jun. 28, 2018

(30) Foreign Application Priority Data
Dec. 27, 2016   (JP) .................. 2016-254439

(51) Int. Cl.
*G11B 5/09*     (2006.01)
*G11B 5/39*     (2006.01)
*G11B 5/66*     (2006.01)
*G11B 5/596*    (2006.01)
*G11B 5/592*    (2006.01)
(Continued)

(52) U.S. Cl.
CPC ........ *G11B 5/3909* (2013.01); *G11B 5/00826* (2013.01); *G11B 5/5526* (2013.01); *G11B 5/584* (2013.01); *G11B 5/5926* (2013.01); *G11B 5/59633* (2013.01); *G11B 5/59688* (2013.01); *G11B 5/66* (2013.01); *G11B 5/70* (2013.01)

(58) Field of Classification Search
CPC ................. G11B 2005/001–2005/0018; G11B 2005/3996; G11B 5/00813–5/00826; G11B 5/29–5/3116; G11B 5/39–5/3993; G11B 2220/95–2220/956
USPC ............................ 360/55, 69, 75, 77.12, 134
See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |

(Continued)

FOREIGN PATENT DOCUMENTS

| | | |
|---|---|---|
| DE | 101 46 429 A1 | 3/2002 |
| GB | 2495356 A | 4/2013 |

(Continued)

OTHER PUBLICATIONS

Office Action dated May 4, 2018, which issued during the prosecution of U.S. Appl. No. 15/625,428.

(Continued)

*Primary Examiner* — Peter Vincent Agustin
(74) *Attorney, Agent, or Firm* — Sughrue Mion, PLLC

(57) ABSTRACT

The magnetic tape device includes: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes a servo pattern, and a coefficient of friction measured regarding a base portion of a surface of the magnetic layer is equal to or smaller than 0.30.

12 Claims, 1 Drawing Sheet

(51) Int. Cl.
  *G11B 5/55* (2006.01)
  *G11B 5/008* (2006.01)
  *G11B 5/584* (2006.01)
  *G11B 5/70* (2006.01)

(56) References Cited

U.S. PATENT DOCUMENTS

| | | |
|---|---|---|
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,689,384 A | 11/1997 | Albrecht et al. |
| 5,728,454 A | 3/1998 | Inaba et al. |
| 5,786,074 A | 7/1998 | Soui |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,921,592 B2 | 7/2005 | Tani et al. |
| 6,939,606 B2 | 9/2005 | Hashimoto et al. |
| 6,950,269 B1 | 9/2005 | Johnson |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2004/0018388 A1 | 1/2004 | Kitamura et al. |
| 2004/0053074 A1 | 3/2004 | Jingu et al. |
| 2004/0197605 A1 | 10/2004 | Seki et al. |
| 2004/0213948 A1* | 10/2004 | Saito ............... G11B 5/70678 428/842.8 |
| 2004/0218304 A1 | 11/2004 | Goker et al. |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1* | 12/2005 | Sueki ................... G11B 5/70 360/134 |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0232883 A1 | 10/2006 | Biskeborn et al. |
| 2007/0020490 A1 | 1/2007 | Harasawa et al. |
| 2007/0224456 A1* | 9/2007 | Murao ................. G11B 5/738 428/840.2 |
| 2007/0230054 A1 | 10/2007 | Takeda et al. |
| 2007/0231606 A1 | 10/2007 | Hanai |
| 2008/0144211 A1 | 6/2008 | Weber et al. |
| 2008/0152956 A1* | 6/2008 | Murayama ............ G11B 5/70 428/840 |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1* | 3/2011 | Imaoka ................. G11B 5/70 428/336 |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |

(56) References Cited

U.S. PATENT DOCUMENTS

| | | |
|---|---|---|
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-49731 A | 3/2010 |
| JP | 2011-48878 A | 3/2011 |
| JP | 2011-210288 A | 10/2011 |

(56) References Cited

FOREIGN PATENT DOCUMENTS

| JP | 2011-225417 A | 11/2011 |
|---|---|---|
| JP | 2012-38367 A | 2/2012 |
| JP | 2012-043495 A | 3/2012 |
| JP | 2012-203955 A | 10/2012 |
| JP | 2013-77360 A | 4/2013 |
| JP | 2014-15453 A | 1/2014 |
| JP | 2014-179149 A | 9/2014 |
| JP | 2015-39801 A | 3/2015 |
| JP | 2016-15183 A | 1/2016 |

OTHER PUBLICATIONS

Office Action dated May 2, 2018, which issued during the prosecution of U.S. Appl. No. 15/280,195.
Office Action dated May 4, 2018, which issued during the prosecution of U.S. Appl. No. 15/422,821.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Notice of Allowance dated Aug. 30, 2017, which issued during the prosecution of U.S. Appl. No. 15/466,143.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Office Action dated Dec. 6, 2016 from the United States Patent and Trademark Office in U.S. Appl. No. 14/757,555.
Office Action dated Dec. 5, 2016 from the United States Patent and Trademark Office in U.S. Appl. No. 14/978,834.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 15/422,821.
Notice of Allowance dated Sep. 4, 2018, which issued during the prosecution of U.S. Appl. No. 15/625,428.
Office Action dated Aug. 3, 2018 from the United States Patent and Trademark Office in U.S. Appl. No. 15/380,336.
Office Action dated Aug. 23, 2018 from the United States Patent and Trademark Office in U.S. Appl. No. 15/614,876.
Office Action dated Aug. 24, 2018 from the United States Patent and Trademark Office in U.S. Appl. No. 15/620,916.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jul. 6, 2018, which issued during the prosecution of U.S. Appl. No. 15/848,173.
Office Action dated Jun. 7, 2018 which issued during the prosecution of U.S. Appl. No. 15/380,309.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
Notice of Allowance dated Apr. 25, 2017 which issued during the prosecution of U.S. Appl. No. 15/072,550.
Notice of Allowance dated Apr. 5, 2018, which issued during the prosecution of U.S. Appl. No. 14/867,752.
Notice of Allowance dated Dec. 2, 2016 which issued during the prosecution of U.S. Appl. No. 14/753,227.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 6, 2015, which issued during the prosecution of U.S. Appl. No. 14/209,065.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.

(56) References Cited

OTHER PUBLICATIONS

Office Action dated Nov. 28, 2018, which issued during the prosecution of U.S. Appl. No. 15/900,080.
Office Action dated Nov. 28, 2018, which issued during the prosecution of U.S. Appl. No.15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018, which issued during the prosecution of U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated May 4, 2018 which issued during the prosecution of U.S. Appl. No. 15/422,944.
Notice of Allowance dated Oct. 11, 2018, which issued during the prosecution of U.S. Appl. No. 15/422,944.
A Notice of Allowance dated Aug. 9, 2018, which issued during the prosecution of U.S. Appl. No. 15/920,563.
Office Action dated Dec. 17, 2018, which issued during the prosecution of U.S. Appl. No. 15/920,533.
Notice of Allowance dated Dec. 4, 2018, which issued during the prosecution of U.S. Appl. No. 15/625,428.
Office Action dated Dec. 20, 2018, which issued during the prosecution of U.S. Appl. No. 15/900,164.
Office Action dated Jul. 3, 2018, which issued during the prosecution of U.S. Appl. No. 15/920,518.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 14, 2018, which issued during the prosecution of U.S. Appl. No. 15/920,517.
Office Action dated Dec. 17, 2018, which issued during the prosecution of U.S. Appl. No. 15/920,544.
Office Action dated Dec. 17, 2018, which issued during the prosecution of U.S. Appl. No. 15/920,538.
Office Action dated Dec. 17, 2018, which issued during the prosecution of U.S. Appl. No. 15/920,515.
Office Action dated Dec. 21, 2018, which issued during the prosecution of U.S. Appl. No. 15/900,230.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No.. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Office Action dated Dec. 21, 2018 in U.S. Appl. No. 15/900,160.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Mar. 5, 2019 in U.S. Appl. No. 15/443,026.
Notice of Allowance dated Mar. 5, 2019 in U.S. Appl. No. 16/009,603.
Notice of Allowance dated Apr. 16, 2019 in U.S. Appl. No. 15/625,428.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.

(56) References Cited

OTHER PUBLICATIONS

"Introduction to TMR Magnetic Sensors", Anonymous, Mar. 12, 2015, MR Sensor Technology, pp. 1-5 (Year: 2015).
Office Action dated Mar. 6, 2019 in U.S. Appl. No. 15/854,403.
Office Action dated Apr. 23, 2019 in Japanese Application No. 2016-169851.
Office Action dated Apr. 23, 2019 in Japanese Application No. 2016-182230.
Notice of Allowance dated Apr. 30, 2019 in U.S. Appl. No. 15/380,309.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/920,616.
Office Action dated Apr. 4, 2019 in U.S. Appl. No. 16/184,312.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No.15/388,911.

* cited by examiner

MAGNETIC TAPE DEVICE AND HEAD TRACKING SERVO METHOD

CROSS-REFERENCE TO RELATED APPLICATIONS

This application claims priority under 35 U.S.C 119 to Japanese Patent Application No. 2016-254439 filed on Dec. 27, 2016. The above application is hereby expressly incorporated by reference, in its entirety, into the present application.

BACKGROUND OF THE INVENTION

1. Field of the Invention

The present invention relates to a magnetic tape device and a head tracking servo method.

2. Description of the Related Art

Magnetic recording is used as a method of recording information in a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head as a reproducing head for reproducing information in the magnetic disk device. On the other hand, the usage of the TMR head as a reproducing head in the magnetic tape device is currently still in a stage where the future usage thereof is expected, and the usage thereof is not yet practically realized.

However, in the magnetic tape, information is normally recorded on a data band of the magnetic tape. Accordingly, data tracks are formed in the data band. As means for realizing high capacity of the magnetic tape, a technology of disposing the larger amount of data tracks in a width direction of the magnetic tape by narrowing the width of the data track to increase recording density is used. However, in a case where the width of the data track is narrowed and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer and performing head tracking servo has been recently proposed and practically used. In a magnetic servo type head tracking servo among head tracking servos, a servo pattern is formed in a magnetic layer of a magnetic tape, and this servo pattern is read by a servo head to perform head tracking servo. The head tracking servo is to control a position of a magnetic head in the magnetic tape device. The head tracking servo is more specifically performed as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure signal-to-noise-ratio (SNR) at the time of reading the servo pattern. As a magnetic head for this, the inventors focused on a TMR head which has been proposed to be used as a reproducing head in the magnetic disk device in JP2004-185676A. As described above, the usage of the TMR head in the magnetic tape device is still in a stage where the future use thereof as a reproducing head for reproducing information is expected, and the usage of the TMR head as the servo head has not even proposed yet. However, the inventors have thought that, it is possible to deal with realization of higher sensitivity of the future magnetic tape, in a case where the TMR head is used as the servo head in the magnetic tape device which performs the head tracking servo.

That is, an object of one aspect of the invention is to provide a magnetic tape device in which a TMR head is mounted as a servo head.

A magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. In a case where the TMR head is used as the servo head, the TMR head detects a change in leakage magnetic field generated from a magnetic layer in which the servo pattern is formed, as a change in resistance value (electric resistance) and reads the servo pattern (reproduces a servo signal) by converting the change in resistance value into a change in voltage. It is said that a resistance value of the TMR head is generally high, as disclosed in a paragraph 0007 of JP2004-185676A, but occurrence of a significant decrease in resistance value in the TMR head may cause a decrease in sensitivity of the TMR head, thereby resulting in a decrease in signal intensity of a servo signal reproduced by the servo head and a decrease in SNR accompanied with that. Accordingly, the accuracy of the head position controlling of the head tracking servo may decrease.

During intensive studies for achieving the object described above, the inventors have found a phenomenon which was not known in the related art, in that, in a case of using the TMR head as a servo head in the magnetic tape device which performs the head tracking servo, a significant decrease in resistance value (electric resistance) occurs in the TMR head. A decrease in resistance value of the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of using the TMR head was not even confirmed in the related art. A difference in the recording and reproducing system between the magnetic disk device and the magnetic tape device, specifically, contact and non-contact between a magnetic recording medium and a magnetic head may be the reason why a significant decrease in resistance value of the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads.

With respect to this, as a result of more intensive studies after finding the phenomenon described above, the inventors have newly found the following points.

It is desired that the magnetic tape is transported at a low speed in the magnetic tape device, in order to prevent a deterioration in recording and reproducing characteristics. But, in a case where the magnetic tape is transported at a low speed which is equal to or lower than a predetermined speed in the magnetic tape device (specifically, in a case where a magnetic tape transportation speed is equal to or lower than 18 m/sec), a decrease in resistance value of the TMR head which reads a servo pattern for performing head tracking servo at the time of recording and/or reproduction of information particularly significantly occurs.

However, such a decrease in resistance value can be prevented by using a magnetic tape described below as the magnetic tape.

One aspect of the invention has been completed based on the finding described above.

That is, according to one aspect of the invention, there is provided a magnetic tape device comprising: a magnetic tape; and a servo head, in which a magnetic tape transportation speed of the magnetic tape device is equal to or lower than 18 m/sec, the servo head is a magnetic head (hereinafter, also referred to as a "TMR head") including a tunnel magnetoresistance effect type element (hereinafter, also referred to as a "TMR element") as a servo pattern reading element, the magnetic tape includes a non-magnetic support, and a magnetic layer including ferromagnetic powder and a binding agent on the non-magnetic support, the magnetic layer includes a servo pattern, and a coefficient of friction measured regarding a base portion of a surface of the magnetic layer, is equal to or smaller than 0.30.

According to another aspect of the invention, there is provided a head tracking servo method comprising: reading a servo pattern of a magnetic layer of a magnetic tape by a servo head in a magnetic tape device, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, and a coefficient of friction measured regarding a base portion of a surface of the magnetic layer, is equal to or smaller than 0.30.

The "base portion" of the invention and the specification is a portion of the surface of the magnetic layer of the magnetic tape specified by the following method. In the invention and the specification, the "surface of the magnetic layer" of the magnetic tape is identical to the surface of the magnetic tape on the magnetic layer side. A surface on which volume of a protrusion and volume of a recess in a visual field measured by an atomic force microscope (AFM) are identical to each other is determined as a reference surface. A projection having a height equal to or greater than 15 nm from the reference surface is defined as a projection. A portion in which the number of such projections is zero, that is, a portion of the surface of the magnetic layer of the magnetic tape in which a projection having a height equal to or greater than 15 nm from the reference surface is not detected is specified as the base portion.

A coefficient of friction measured regarding the base portion is a value measured by the following method.

In the base portion (measured part: length of the magnetic tape in a longitudinal direction of 10 µm), a diamond spherical indenter having a radius of 1 µm is allowed to reciprocate once with a load of 100 µN and a speed of 1 µm/sec to measure a frictional force (horizontal force) and a normal force. The frictional force and the normal force measured here are an arithmetical mean of respective values obtained by continuously measuring frictional forces and normal forces during the one reciprocating operation. The measurement described above can be performed with TI-950 type TRIBOINDENTER manufactured by Hysitron, Inc. A value of a coefficient of friction µ is calculated from an arithmetical mean of the frictional forces and an arithmetical mean of the normal forces measured as described above. The coefficient of friction is a value measured by an equation of F=µN, from the frictional force (horizontal force) F (unit: newton (N)) and the normal force N (unit: newton (N)). The measurement and the calculation of the value of the coefficient of friction µ are performed at three portions of the base portion arbitrarily selected from the surface of the magnetic layer of the magnetic tape, and an arithmetical mean of the three measured values obtained is set as a coefficient of friction measured regarding the base portion. Hereinafter, the coefficient of friction measured regarding the base portion is also referred to as a "base friction".

One aspect of the magnetic tape device and the head tracking servo method is as follows.

In one aspect, the coefficient of friction measured regarding the base portion of the surface of the magnetic layer is 0.20 to 0.30.

In one aspect, a center line average surface roughness Ra measured regarding a surface of the magnetic layer is equal to or smaller than 2.8 nm.

In the invention and the specification, the center line average surface roughness Ra measured regarding the surface of the magnetic layer of the magnetic tape is a value measured with an atomic force microscope in a region having an area of 40 µm×40 µm. As an example of the measurement conditions, the following measurement conditions can be used. The center line average surface roughness Ra shown in examples which will be described later is a value obtained by the measurement under the following measurement conditions.

The measurement is performed regarding the region of 40 µm×40 µm of the area of the surface of the magnetic layer of the magnetic tape with an AFM (Nanoscope 4 manufactured by Veeco Instruments, Inc.). A scan speed (probe movement speed) is set as 40 µm/sec and a resolution is set as 512 pixel×512 pixel.

In one aspect, the center line average surface roughness Ra is equal to or smaller than 2.5 nm.

In one aspect, the magnetic tape includes a non-magnetic layer including non-magnetic powder and a binding agent between the non-magnetic support and the magnetic layer, and a total thickness of the magnetic layer and the non-magnetic layer is equal to or smaller than 1.8 µm.

In one aspect, the total thickness of the magnetic layer and the non-magnetic layer is equal to or smaller than 1.1 µm.

According to one aspect of the invention, it is possible to prevent occurrence of a significant decrease in resistance value in the TMR head, in a case of reading a servo pattern of the magnetic layer of the magnetic tape which is transported at the magnetic tape transportation speed equal to or lower than 18 m/sec, by the TMR head.

DESCRIPTION OF THE PREFERRED EMBODIMENTS

Magnetic Tape Device

Figure 1:
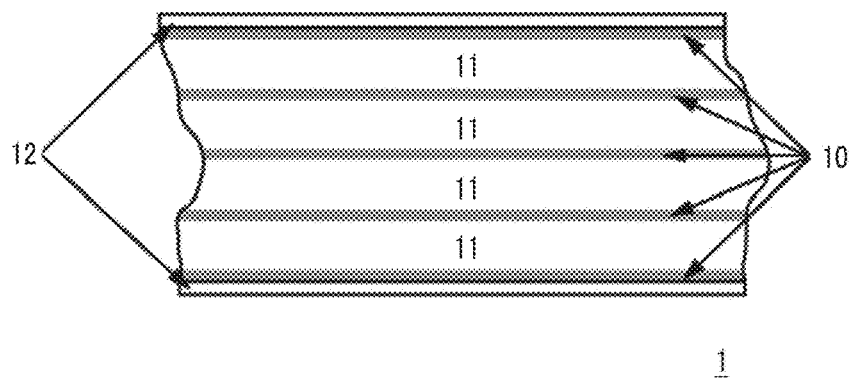
FIG. 1 shows an example of disposition of data bands and servo bands.

One aspect of the invention relates to a magnetic tape device including: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes a servo pattern, and a coefficient of friction measured regarding a base portion of a surface of the magnetic layer, is equal to or smaller than 0.30.

The magnetic tape transportation speed of the magnetic tape device is also referred to as a running speed. In the invention and the specification, the "magnetic tape transportation speed" is a relative speed between the magnetic tape transported in the magnetic tape device and the servo head in a case where the servo pattern is read by the servo head. As a result of intensive studies of the inventors, the inventors have newly found that it is possible to prevent a phenomenon in which a decrease in resistance value of the TMR head used as the servo head in the magnetic tape device in which the magnetic tape transportation speed is equal to or lower than 18 m/sec, occurs particularly significantly, by using the magnetic tape which includes the magnetic layer including ferromagnetic powder and a binding agent on the non-magnetic support, and in which the coefficient of friction measured regarding the base portion of the surface of the magnetic layer is equal to or smaller than 0.30. This point will be further described below.

In the magnetic tape device, in a case of using a magnetic tape of the related art, in a case where the TMR head is used as the servo head under specific conditions in which the magnetic tape transportation speed is equal to or lower than 18 m/sec, a phenomenon in which a resistance value (electric resistance) significantly decreases occurs in the TMR head used as the servo head. This phenomenon is a phenomenon that is newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reading a servo pattern formed in the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reading a servo pattern formed in the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurred even at one portion between the two electrodes as described above is a phenomenon which does not occur in other MR heads. In the magnetic disk device using a levitation type recording and reproducing system, a magnetic disk and a magnetic head do not come into contact with each other, and thus, damage causing short circuit hardly occurs. On the other hand, in the magnetic tape device using a sliding type recording and reproducing system, the magnetic tape and the servo head come into contact with each other and slide on each other, in a case of reading a servo pattern by the servo head. Accordingly, the TMR head is damaged due to the sliding between the TMR head and the magnetic tape, and thus, short circuit easily occurs. Among these, the inventors have thought that, in a case where the transportation speed of the magnetic tape is as low as a speed equal to or lower than 18 m/sec, a possibility that the TMR head comes into contact with the base portion of the surface of the magnetic layer in a case of reading a servo pattern increases, compared to a case where the transportation speed of the magnetic tape exceeds 18 m/sec. Accordingly, the inventors have surmised that, in a case where any measures are not prepared, the TMR head is affected by the contact with the base portion and the TMR head is easily damaged. The inventors have assumed that this is the reason why a decrease in resistance value of the TMR head occurs particularly significantly in a case of using the TMR head as the servo head in the magnetic tape device in which the magnetic tape transportation speed is equal to or lower than 18 m/sec.

With respect to this, according to the magnetic tape in which a coefficient of friction (base friction) measured regarding the base portion of the surface of the magnetic layer is equal to or smaller than 0.30, it is possible to allow the TMR head coming into contact with the base portion to smoothly slide on the base portion. Accordingly, the inventors have surmised that the reducing of the effect on the TMR head due to the contact with the base portion contributes to the prevention of occurrence of short circuit due to a damage on the TMR head.

However, the above descriptions are merely a surmise of the inventors and the invention is not limited thereto.

Regarding the base friction, JP2016-071912A discloses that the base friction is set to be in a specific range, in order to prevent a decrease in electromagnetic conversion characteristics of a thinned magnetic tape during repeated running. However, as described above, the usage of the TMR head as a servo head in the magnetic tape device is not even proposed in the related art. In addition, in the magnetic tape device in which the TMR head is mounted as a servo head, the occurrence of a particularly significant decrease in resistance value of the TMR head at a specific magnetic tape transportation speed (specifically, equal to or lower than 18 m/sec) is a phenomenon which was not known in the related art. With respect to such a phenomenon, the effect of the base friction and a possibility of prevention of the phenomenon by setting the base friction to be equal to or smaller than 0.30 are not disclosed in JP2016-071912A and is newly found by the inventors as a result of intensive studies.

Hereinafter, the magnetic tape device will be described more specifically. A "decrease in resistance value of the TMR head" described below is a significant decrease in resistance value of the TMR head occurring in a case of reading a servo pattern by using the TMR head as the servo head, in the magnetic tape device having the magnetic tape transportation speed equal to or lower than 18 m/sec, unless otherwise noted.

Magnetic Tape

Base Friction

The coefficient of friction (base friction) measured regarding the base portion of the surface of the magnetic layer of the magnetic tape is equal to or smaller than 0.30, from a viewpoint of preventing a decrease in resistance value of the TMR head, and is preferably equal to or smaller than 0.28 and more preferably equal to or smaller than 0.26, from a viewpoint of further preventing a decrease in resistance value of the TMR head. The base friction can be, for example, equal to or greater than 0.10, equal to or greater than 0.15, or equal to or greater than 0.20. However, from a viewpoint of preventing a decrease in resistance value of the TMR head, a low base friction is preferable, and thus, the base friction may be smaller than the values described above.

In the measurement method of the base friction described above, the reason why a projection having a height equal to or greater than 15 nm from the reference surface is defined as a projection is because, normally, a projection recognized as a projection present on the surface of the magnetic layer is mainly a projection having a height equal to or greater than 15 nm from the reference surface. Such a projection is, for example, formed of non-magnetic powder such as an abrasive on the surface of the magnetic layer. With respect to this, it is considered that more microscopic ruggedness than ruggedness formed by such a projection is present on the surface of the magnetic layer. The inventors have surmised that it is possible to adjust the base friction by controlling a shape of the microscopic ruggedness. As a method for realizing the adjustment described above, a method of using two or more kinds of ferromagnetic powders having different average particle sizes as the ferromagnetic powder is used. More specifically, it is thought that, the microscopic ruggedness can be formed on the base portion, in a case where the ferromagnetic powder having a greater average particle size becomes a protrusion, and it is possible to increase a percentage of the protrusion present on the base portion by increasing a mixing percentage of the ferromagnetic powder having a greater average particle size (or, conversely, to decrease a percentage of protrusion present on the base portion by decreasing the mixing percentage). Such a method will be described later more specifically.

As another method, a method of forming a magnetic layer with other non-magnetic powder having a greater average particle size than that of ferromagnetic powder, in addition to non-magnetic powder such as an abrasive which can form a projection having a height equal to or greater than 15 nm from the reference surface on the surface of the magnetic layer. More specifically, it is thought that, the microscopic ruggedness can be formed on the base portion, in a case where the other non-magnetic powder becomes a protrusion, and it is possible to increase a percentage of the protrusion present on the base portion by increasing a mixing percentage of the non-magnetic powder (or, conversely, to decrease a percentage of protrusion present on the base portion by decreasing the mixing percentage). Such a method will be described later more specifically.

In addition, it is also possible to adjust the base friction by combining the two kinds of methods.

However, the adjustment methods are merely examples, and it is possible to realize a base friction equal to or smaller than 0.30 by an arbitrary method capable of adjusting the base friction, and such an aspect is also included in the invention.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used.

As described above, as a method of adjusting the base friction, a method of forming a magnetic layer with two or more kinds of ferromagnetic powders having different average particle sizes as ferromagnetic powder is used. In this case, it is preferable that the ferromagnetic powder having a smaller average particle size is used as ferromagnetic powder used with the largest proportion, among the two or more kinds of ferromagnetic powder, from a viewpoint of improving recording density of the magnetic tape. From this viewpoint, in a case where two or more kinds of ferromagnetic powders having different average particle sizes are used as ferromagnetic powder of a magnetic layer, it is preferable that the ferromagnetic powder having an average particle size equal to or smaller than 50 nm is used as the ferromagnetic powder used with the largest proportion. On the other hand, it is preferable that an average particle size of the ferromagnetic powder used with the largest proportion is equal to or greater than 10 nm, from a viewpoint of stability of magnetization. In a case of using one of ferromagnetic powder without using two or more kinds of ferromagnetic powders having different average particle sizes, the average particle size of the ferromagnetic powder is preferably equal to or smaller than 50 nm and more preferably equal to or greater than 10 nm, due to the reasons described above.

With respect to this, it is preferable that the ferromagnetic powder used with the ferromagnetic powder used with the largest proportion has a greater average particle size than that of the ferromagnetic powder used with the largest proportion. This may be because the base friction can be decreased due to the protrusion formed of the ferromagnetic powder having a great average particle size on the base portion. From this viewpoint, a difference between an average particle size of the ferromagnetic powder used with the largest proportion and an average particle size of the ferromagnetic powder used therewith, acquired as "(latter average particle size)–(former average particle size)" is preferably 10 to 80 nm, more preferably 10 to 50 nm, even more preferably 10 to 40 nm, and still more preferably 12 to 35 nm. As the ferromagnetic powder used with the ferromagnetic powder used with the largest proportion, it is also possible to use two or more kinds of ferromagnetic powders having different average particle sizes. In this case, it is preferable that an average particle size of at least one of ferromagnetic powder of the two or more kinds of ferromagnetic powders satisfies the difference described above, it is more preferable that average particle sizes of more kinds of ferromagnetic powders satisfy the difference described above, and it is even more preferable that average particle sizes of all of the ferromagnetic powders satisfy the difference described above, with respect to the average particle size of the ferromagnetic powder used with the largest proportion.

Regarding two or more kinds of ferromagnetic powders having different average particle sizes, from a viewpoint of controlling base friction, a mixing ratio of the ferromagnetic powder used with the largest proportion to the other ferromagnetic powder (in a case of using two or more kinds of ferromagnetic powders having different average particle sizes as other ferromagnetic powder, the total thereof), is preferably 90.0:10.0 (former:latter) to 99.9:0.1 and more preferably 95.0:5.0 to 99.5:0.5 based on mass.

Here, the ferromagnetic powders having different average particle sizes indicate the total or a part of a batch of the ferromagnetic powders having different average particle sizes. In a case where particle size distribution based on the number or volume of the ferromagnetic powder included in the magnetic layer of the magnetic tape formed with the ferromagnetic powders having different average particle sizes as described above is measured by a well-known measurement method such as a dynamic light scattering method or a laser diffraction method, an average particle size or a maximum peak in the vicinity thereof of the ferromagnetic powder used with the largest proportion can be normally confirmed in a particle size distribution curve obtained by the measurement. In addition, an average particle size or a peak in the vicinity thereof of each ferromagnetic powder may be confirmed. Accordingly, in a case where the particle size distribution of the ferromagnetic powder included in the magnetic layer of the magnetic tape formed by using ferromagnetic powder having an average particle size of 10 to 50 nm with the largest proportion, for example, is measured, the maximum peak can be generally confirmed in a range of the particle size of 10 to 50 nm in the particle size distribution curve.

A part of the other ferromagnetic powders described above may be substituted with other non-magnetic powder which will be described later.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic powder and other powder is an average particle size obtained by the method described above, unless otherwise noted. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

As a preferred specific example of the ferromagnetic powder, ferromagnetic hexagonal ferrite powder can be used. In a case where the ferromagnetic powder used with the largest proportion is ferromagnetic hexagonal ferrite powder, an average particle size thereof is preferably 10 nm to 50 nm and more preferably 20 nm to 50 nm, from a viewpoint of realization of high-density recording and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. In a case where the ferromagnetic powder used with the largest proportion is ferromagnetic metal powder, an average particle size thereof is preferably 10 nm to 50 nm and more preferably 20 nm to 50 nm, from a viewpoint of realization of high-density recording and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

As the ferromagnetic powder, the magnetic tape may include only one of ferromagnetic hexagonal ferrite powder and ferromagnetic metal powder, may include both thereof, or may include other ferromagnetic powders with one or both thereof.

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer includes ferromagnetic powder and a binding agent and if necessary, may include one or more kinds of additives. As the additives, the curing agent described above is used as an example. In addition, examples of the additive which can be included in the magnetic layer include non-magnetic powder, a lubricant, a dispersing agent, a dispersing assistant, an antifungal agent, an antistatic agent, an antioxidant, and carbon black. As the additives, a commercially available product can be suitably selected and used according to the desired properties.

The magnetic layer preferably includes one or two or more kinds of non-magnetic powders. As the non-magnetic powder, non-magnetic powder (hereinafter, referred to as a "projection formation agent") which can function as a projection formation agent which forms projections suitably protruding from the surface of the magnetic layer can be used. The projection formation agent is a component which can contribute to the control of friction properties of the surface of the magnetic layer of the magnetic tape. The magnetic layer may include non-magnetic powder (hereinafter, referred to as an "abrasive") which can function as an abrasive can be used. The magnetic layer of the magnetic tape preferably includes at least one of the projection formation agent or the abrasive and more preferably includes both thereof.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

Meanwhile, the abrasive is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide (BC), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic powder such as an abrasive, in order to decrease the center line average surface roughness Ra measured regarding the surface of the magnetic layer.

As described above, in order to control the base friction to be equal to or smaller than 0.30, other non-magnetic powders can also be used in addition to the non-magnetic powder described above. Such non-magnetic powder preferably has Mohs hardness equal to or smaller than 8, and various non-magnetic powders normally used in the non-magnetic layer can be used. Specifically, the non-magnetic layer is as described later. As more preferred non-magnetic powder, red oxide can be used. The Mohs hardness of red oxide is approximately 6.

It is preferable that the other non-magnetic powder described above has an average particle size greater than that of the ferromagnetic powder, in the same manner as the ferromagnetic powder used with the ferromagnetic powder used with the largest proportion described above. This is because the base friction may decrease due to the protrusion formed of the other non-magnetic powder on the base portion. From a viewpoint, difference between an average particle size of the ferromagnetic powder and an average particle size of the other non-magnetic powder used therewith, acquired as "(latter average particle size)−(former average particle size)" is preferably 10 to 80 nm and more preferably 10 to 50 nm. In a case of using two or more kinds of ferromagnetic powders having different average particle sizes as the ferromagnetic powder, the ferromagnetic powder used for calculating a difference the average particle size thereof and the average particle size of the other non-magnetic powder is ferromagnetic powder used with the largest proportion among two or more kinds of ferromagnetic powders. As the other non-magnetic powder, it is also possible to use two or more kinds of non-magnetic powders having different average particle sizes. In this case, it is preferable that an average particle size of at least one of non-magnetic powder of the two or more of non-magnetic powders satisfies the difference described above, it is more preferable that average particle sizes of more kinds of non-magnetic powders satisfy the difference described above, and it is even more preferable that average particle sizes of all of the non-magnetic powders satisfy the difference described above, with respect to the average particle size of the ferromagnetic powder.

From a viewpoint of controlling base friction, a mixing ratio of the ferromagnetic powder to the other non-magnetic powder (in a case of using two or more kinds of non-magnetic powders having different average particle sizes as other non-magnetic powder, the total thereof), is preferably 90.0:10.0 (former:latter) to 99.9:0.1 and more preferably 95.0:5.0 to 99.5:0.5 based on mass.

Center Line Average Surface Roughness Ra Measured Regarding Surface of Magnetic Layer Increasing a surface smoothness of the magnetic layer in the magnetic tape causes improvement of electromagnetic conversion characteristics. Regarding the surface smoothness of the magnetic layer, the center line average surface roughness Ra measured regarding the surface of the magnetic layer can be an index.

In one aspect, the center line average surface roughness Ra measured regarding the surface of the magnetic layer of the magnetic tape is preferably equal to or smaller than 2.8 nm, more preferably equal to or smaller than 2.5 nm, even more preferably equal to or smaller than 2.3 nm, and still more preferably equal to or smaller than 2.0 nm, from a viewpoint of improving electromagnetic conversion characteristics. However, according to the studies of the inventors, it is found that, in a case where the center line average surface roughness Ra measured regarding the surface of the magnetic layer is equal to or smaller than 2.5 nm and any measures are not prepared, a decrease in resistance value of the TMR head tends to occur even more significantly. However, even a significant decrease in resistance value of the TMR head occurring in a case where the Ra is equal to or smaller than 2.5 nm can be prevented, in a case of the magnetic tape device according to one aspect of the invention. In addition, the center line average surface roughness Ra measured regarding the surface of the magnetic layer can be equal to or greater than 1.2 nm or equal to or greater than 1.3 nm. From a viewpoint of improving electromagnetic conversion characteristics, a low value of the Ra is preferable, and thus, the Ra may be lower than the values described above.

The surface smoothness of the magnetic layer, that is, the center line average surface roughness Ra measured regarding the surface of the magnetic layer can be controlled by a well-known method. For example, the surface smoothness of the magnetic layer can be controlled by adjusting a size of various powder (for example, ferromagnetic powder, non-magnetic powder, and the like) included in the magnetic layer or manufacturing conditions of the magnetic tape.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.0 to 6.0 µm.

A thickness of the magnetic layer is preferably equal to or smaller than 0.15 µm and more preferably equal to or smaller than 0.1 µm, from a viewpoint of realization of high-density recording required in recent years. The thickness of the magnetic layer is even more preferably 0.01 to 0.1 µm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 µm and is preferably 0.1 to 1.0 µm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.8 µm, more preferably equal to or smaller than 1.5 µm, and even more preferably equal to or smaller than 1.1 µm, from a viewpoint of thinning the magnetic tape. According to the studies of the inventors, it is found that, in a case where the total thickness of the magnetic layer and the non-magnetic layer is equal to or smaller than 1.1 µm and any measures are not prepared, a decrease in resistance value of the TMR head tends to occur even more significantly. However, even a significant decrease in resistance value of the TMR head occurring in a case where the total thickness of the magnetic layer and the non-magnetic layer is equal to or smaller than 1.1 µm can be prevented, in a case of the magnetic tape device according to one aspect of the invention. In addition, the total thickness of the magnetic layer and the non-magnetic layer can be, for example, equal to or greater than 0.1 µm or equal to or greater than 0.2 µm.

A thickness of the back coating layer is preferably equal to or smaller than 0.9 µm and even more preferably 0.1 to 0.7 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, in one aspect, regarding the magnetic layer forming composition, a dispersion liquid (magnetic solution) including ferromagnetic powder and a dispersion liquid (abrasive liquid) including an abrasive are separately dispersed and prepared, and these dispersion liquids are mixed with other components at the same time or in order to prepare a magnetic layer forming composition. Other descriptions for the preparation of each layer forming composition, a description disclosed in a paragraph 0065 of JP2010-231843A can also be referred to.

As described above, in one aspect, regarding the control of the base friction, a magnetic tape can be manufactured by using two or more kinds of ferromagnetic powders having different average particle sizes. That is, the magnetic layer can be formed with first ferromagnetic powder, and one or more kinds of ferromagnetic powder having an average particle size greater than that of the first ferromagnetic powder, as ferromagnetic powder. As preferred aspects of a forming method of such a magnetic layer, aspects of the following (1) to (3) can be used. A combination of two or more aspects described below is a more preferred aspect of the forming method of a magnetic layer. The first ferromagnetic powder is one of ferromagnetic powder among the two or more kinds of ferromagnetic powders and is preferably ferromagnetic powder used with the largest proportion described above.

(1) An average particle size of the first ferromagnetic powder is 10 to 80 nm.

(2) A difference between an average particle size of the ferromagnetic powder having an average particle size greater than that of the first ferromagnetic powder, and the average particle size of the first ferromagnetic powder is 10 to 50 nm.

(3) A mixing ratio of the first ferromagnetic powder to the ferromagnetic powder having an average particle size greater than that of the first ferromagnetic powder is 90.0:10.0 (former:latter) to 99.9:0.1 based on mass.

In another aspect, a magnetic tape can also be manufactured by using non-magnetic powder other than the abrasive and the projection formation agent, as the non-magnetic powder of the magnetic layer. That is, the magnetic layer can be formed with the other non-magnetic powder. As preferred aspects of a forming method of such a magnetic layer, aspects of the following (4) to (6) can be used. A combination of two or more aspects described below is a more preferred aspect of the forming method of a magnetic layer.

(4) An average particle size of the other non-magnetic powder is greater than an average particle size of the ferromagnetic powder.

(5) A difference between the average particle size of the ferromagnetic powder and the average particle size of the other non-magnetic powder is 10 to 80 nm.

(6) A mixing ratio of the ferromagnetic powder to the other non-magnetic powder is 90.0:10.0 (former:latter) to 99.9:0.1 based on mass.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition to the surface of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to.

Formation of Servo Pattern

A servo pattern is formed in the magnetic layer by magnetizing a specific position of the magnetic layer with a servo pattern recording head (also referred to as a "servo write head"). A well-known technology regarding a servo pattern of the magnetic layer of the magnetic tape which is well known can be applied for the shapes of the servo pattern with which the head tracking servo can be performed and the disposition thereof in the magnetic layer. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals) to the magnetic tape, the magnetic tape is drawn from the magnetic tape cartridge and wound around the reel on the drive side. A servo head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the servo head comes into contact with and slides on the surface of the magnetic layer of the magnetic tape, and accordingly, the reading of the servo pattern is performed by the servo head. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Servo Head

The magnetic tape device includes the TMR head as the servo head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a servo pattern reading element for reading a servo pattern formed in the magnetic layer of the magnetic tape. By converting the detected change in resistance value into a change in voltage, the servo pattern can be read (servo signal can be reproduced).

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the servo pattern can be read. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in electric resistance causes a decrease in accuracy of the head position controlling of the head tracking servo. This decrease in resistance value of the TMR head can be prevented by using a magnetic tape having the base friction equal to or smaller than 0.30 as the magnetic tape in which the magnetic layer includes a servo pattern.

The servo head is a magnetic head including at least the TMR element as a servo pattern reading element. The servo head may include or may not include a reproducing element for reproducing information recorded on the magnetic tape. That is, the servo head and the reproducing head may be one magnetic head or separated magnetic heads. The same applies to a recording element for performing the recording of information in the magnetic tape.

Magnetic Tape Transportation Speed

The magnetic tape transportation speed of the magnetic tape device is equal to or lower than 18 m/sec. Normally, the magnetic tape transportation speed is set in a control unit of the magnetic tape device. It is desired that the magnetic tape is transported at a low speed in the magnetic tape device, in order to prevent a deterioration of recording and reproducing characteristics. But, in a case where the magnetic tape transportation speed is equal to or lower than 18 m/sec in the magnetic tape device including the TMR head as a servo head, a decrease in resistance value of the TMR head used as the servo head occurs particularly significantly. In the magnetic tape device according to one aspect of the invention, such a decrease in resistance value can be prevented by using a magnetic tape having the base friction equal to or smaller than 0.30. The magnetic tape transportation speed is equal to or lower than 18 m/sec or may be equal to or lower than 15 m/sec or equal to or lower than 10 m/sec. The magnetic tape transportation speed can be, for example, equal to or higher than 1 m/sec.

Head Tracking Servo Method

One aspect of the invention relates to a head tracking servo method including: reading a servo pattern of a magnetic layer of a magnetic tape by a servo head in a magnetic tape device, a magnetic tape transportation speed during the reproducing is equal to or lower than 18 m/sec, the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic tape includes a servo pattern, and a coefficient of friction measured regarding a base portion of a surface of the magnetic layer is equal to or smaller than 0.30. The reading of the servo pattern is performed by bringing the magnetic tape into contact with the servo head allowing sliding while transporting (causing running of) the magnetic tape. The details of the magnetic tape and the servo head used in the head tracking servo method are as the descriptions regarding the magnetic tape device according to one aspect of the invention.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed in a magnetic layer, and a position of a servo head is recognized by an interval of time in a case where the servo head has read the two servo patterns having different shapes and an interval of time in a case where the servo head has read two servo patterns having the same shapes. The position of the magnetic head of the magnetic tape in the width direction is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
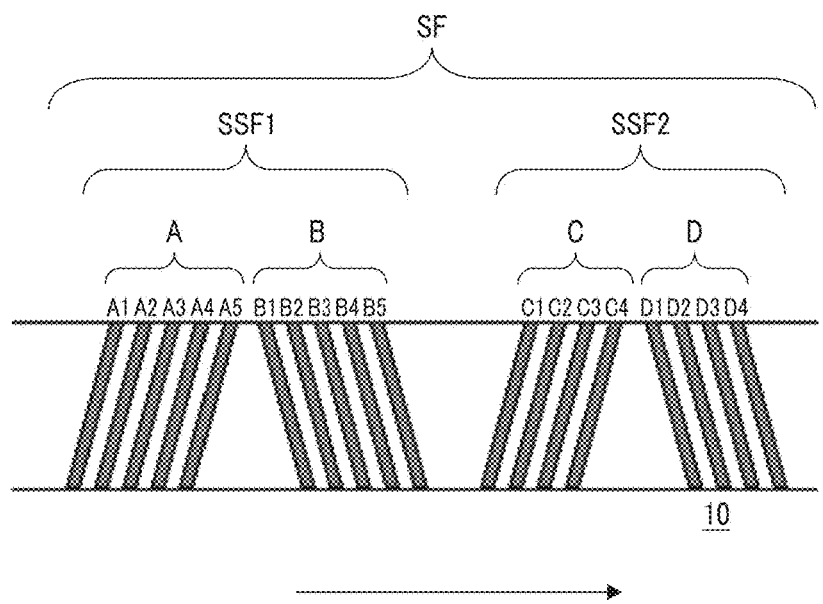
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 1 and 2, but also to entire timing-based servo systems.

For the details of the head tracking servo in the timing-based servo system, well-known technologies such as technologies disclosed in U.S. Pat. No. 5,689,384A, U.S. Pat. No. 6,542,325B, and U.S. Pat. No. 7,876,521B can be referred to, for example. In addition, for the details of the head tracking servo in the amplitude-based servo system, well-known technologies disclosed in U.S. Pat. No. 5,426,543A and U.S. Pat. No. 5,898,533A can be referred to, for example.

According to one aspect of the invention, a magnetic tape used in a magnetic tape device in which a TMR head is used as a servo head and a magnetic tape transportation speed in a case of reading a servo pattern of a magnetic layer of the magnetic tape is equal to or lower than 18 m/sec, the magnetic tape including: a magnetic layer including ferromagnetic powder and a binding agent on a non-magnetic support, in which the magnetic layer includes a servo pattern, and a coefficient of friction measured regarding a base portion of a surface of the magnetic layer is equal to or smaller than 0.30 is also provided. The details of the magnetic tape is also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted.

Example 1

1. Manufacturing of Magnetic Tape (1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-70 manufactured by Sumitomo Chemical Co., Ltd.) having an gelatinization ratio of 65% and a BET specific surface area of 30 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic hexagonal barium ferrite powder: 100.0 parts
  Two kinds of ferromagnetic hexagonal barium ferrite powders below are used
  Ferromagnetic hexagonal barium ferrite powder (1)
  Average particle size and amount used: see Table 1
  Ferromagnetic hexagonal barium ferrite powder (2)
  Average particle size and amount used: see Table 1
$SO_3Na$ group-containing polyurethane resin: 14.0 parts
  Weight-average molecular weight: 70,000, $SO_3Na$ group: 0.2 meq/g
  Cyclohexanone: 150.0 parts
  Methyl ethyl ketone: 150.0 parts
Abrasive Liquid
  Alumina dispersion prepared in the section (1): 6.0 parts
Silica Sol
  Colloidal silica: 2.0 parts
  Average particle size: see Table 1
  Methyl ethyl ketone: 1.4 parts
Other Components
  Stearic acid: 2.0 parts
  Butyl stearate: 6.0 parts
  Polyisocyanate (CORONATE (registered trademark) manufactured by Nippon Polyurethane Industry Co., Ltd.): 2.5 parts
Finishing Additive Solvent
  Cyclohexanone: 200.0 parts
  Methyl ethyl ketone: 200.0 parts
(3) Non-Magnetic Layer Forming Composition List
Non-magnetic inorganic powder: α-iron oxide: 100.0 parts
  Average particle size (average long axis length): 100 nm
  Average acicular ratio: 1.9
  BET specific surface area: 75 $m^2$/g
Carbon black: 20.0 parts
  Average particle size: 20 nm
$SO_3Na$ group-containing polyurethane resin: 18.0 parts
  Weight-average molecular weight: 70,000, $SO_3Na$ group: 0.2 meq/g
Stearic acid: 1.0 part
Cyclohexanone: 300.0 parts
Methyl ethyl ketone: 300.0 parts
(4) Back Coating Layer Forming Composition List
Non-magnetic inorganic powder: α-iron oxide: 80.0 parts
  Average particle size (average long axis length): 0.15 μm
  Average acicular ratio: 7
  BET specific surface area: 52 $m^2$/g
Carbon black: 20.0 parts
  Average particle size: 20 nm
A vinyl chloride copolymer: 13.0 parts
Sulfonic acid group-containing polyurethane resin: 6.0 parts
Phenylphosphonic acid: 3.0 parts
Stearic acid: 3.0 parts
Butyl stearate: 3.0 parts
Polyisocyanate: 5.0 parts
Cyclohexanone: 355.0 parts
Methyl ethyl ketone: 155.0 parts
(5) Preparation of Each Layer Forming Composition The magnetic layer forming composition was prepared by the following method. The magnetic solution was prepared by dispersing (beads-dispersing) each component with a batch type vertical sand mill for 24 hours. As the dispersion beads, zirconia beads having a bead diameter of 0.5 mm were used. The prepared magnetic solution and the abrasive liquid were mixed with other components (silica sol, other components, and finishing additive solvent) and beads-dispersed for 5 minutes by using the sand mill, and a process (ultrasonic dispersion) was performed with a batch type ultrasonic device (20 kHz, 300 W) for 0.5 minutes. After that, the filtering was performed by using a filter having an average hole diameter of 0.5 μm, and the magnetic layer forming composition was prepared.

The non-magnetic layer forming composition was prepared by the following method. Each component excluding stearic acid, cyclohexanone, and methyl ethyl ketone was dispersed by using batch type vertical sand mill for 24 hours to obtain a dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having an average hole diameter of 0.5 μm and a non-magnetic layer forming composition was prepared.

The back coating layer forming composition was prepared by the following method. Each component excluding the lubricant (stearic acid and butyl stearate), polyisocyanate, and cyclohexanone was kneaded and diluted by an open kneader, and subjected to a dispersion process of 12 passes, with a transverse beads mill dispersing device and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 μm and a back coating layer forming composition was prepared.

(6) Manufacturing Method of Magnetic Tape

The non-magnetic layer forming composition prepared in the section (5) was applied to a surface of a support made of polyethylene naphthalate having a thickness of 5.0 μm so that the thickness after the drying becomes a thickness shown in Table 1, and then, the magnetic layer forming composition prepared in the section (5) was applied thereon so that the thickness after the drying becomes a thickness shown in Table 1, and a coating layer was formed. A homeotropic alignment process was performed by applying a magnetic field having a magnetic field strength of 0.3 T to the surface of the coating layer of the magnetic layer forming composition in a vertical direction while the coating layer is not dried, and then, the coating layer was dried. After that, the back coating layer forming composition prepared in the section (5) was applied to the surface of the non-magnetic support made of polyethylene naphthalate on a side opposite to the surface where the non-magnetic layer and the magnetic layer are formed, so that the thickness after the drying becomes 0.5 μm, and then drying was performed.

After that, a calender process (surface smoothing treatment) was performed with a calender roll configured of only a metal roll, at a speed of 100 m/min, linear pressure of 294 kN/m (300 kg/cm), and a calender temperature (surface temperature of a calender roll) shown in Table 1.

Then, a heating process was performed in the environment of the atmosphere temperature of 70° C. for 36 hours. After the heating process, the layer was slit to have a width of ½ inches (0.0127 meters), and a magnetic tape for forming a servo pattern on the magnetic layer was manufactured.

In a state where the magnetic layer of the manufactured magnetic tape was demagnetized, servo patterns having disposition and shapes according to the LTO Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer of the manufactured magnetic tape was acquired by the following method. It was confirmed that the thicknesses of the formed non-magnetic layer and the magnetic layer were the thicknesses shown in Table 1 and the thicknesses of the back coating layer and the non-magnetic support were the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation described below, and the other part was used in order to measure a resistance value of the TMR head which will be described later.

The amount of the ferromagnetic hexagonal barium ferrite powder shown in Table 1 is content of each ferromagnetic hexagonal barium ferrite powder based on mass with respect to 100.0 parts by mass of a total of the ferromagnetic hexagonal barium ferrite powder. An average particle size of the ferromagnetic hexagonal barium ferrite powder shown in Table 1 is a value obtained by collecting the necessary amount from a batch of the powder used in the preparation of the magnetic tape and measuring an average particle size by the method described above. The ferromagnetic hexagonal barium ferrite powder after measuring the average particle size was used in the preparation of a magnetic solution for preparing the magnetic tape.

2. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.), and a center line average surface roughness Ra was acquired. A scan speed (probe movement speed) was set as 40 μm/sec and a resolution was set as 512 pixel×512 pixel.

(2) Base Friction

First, marking was performed on a measurement surface with a laser marker in advance, and an atomic force microscope (AFM) image of a portion separated from the mark by a certain distance (approximately 100 μm) was observed. The observation was performed regarding an area of a visual field of 7 μm×7 μm. At this time, marking was performed on the ARM by changing a cantilever to a hard material (single crystal silicon), so as to easily capture a scanning electron microscope (SEM) image of the same portion as will be described later. All of projections having a height equal to or greater than 15 nm from the reference surface were extracted from the AFM image observed as described above. A portion in which it is determined that projections were not present, was specified as a base portion, and the base friction was measured with TI-950 type TriboIndenter manufactured by Hysitron, Inc. by the method described above.

An SEM image of the same portion as the portion observed with the AFM was observed to obtain a component map, and it was confirmed that the extracted projections having a height equal to or greater than 15 nm from the reference surface were projections formed of alumina or colloidal silica. In Examples 1 to 8, in the component map obtained with the SEM, alumina and colloidal silica were not confirmed in the base portion. Here, the component analysis was performed with the SEM, but the component analysis is not limited to being performed with the SEM, and can be performed by a well-known method such as energy dispersive X-ray spectrometry (EDS) or auger electron spectroscopy (AES).

3. Measurement of Resistance Value of Servo Head

The servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as a value shown in Table 1. The servo head was moved in a width direction of the magnetic tape by 2.5 μm for 1 pass, a resistance value (electric resistance) of the servo head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 1.

Examples 2 to 8 and Comparative Examples 1 to 14

1. Manufacturing of Magnetic Tape

A magnetic tape was manufactured in the same manner as in Example 1, except that various conditions shown in Table 1 were changed as shown in Table 1.

2. Evaluation of Physical Properties of Magnetic Tape

Various physical properties of the manufactured magnetic tape were evaluated in the same manner as in Example 1.

3. Measurement of Resistance Value of Servo Head

A resistance value of the servo head was measured by the same method as that in Example 1, by using the manufactured magnetic tape. The magnetic tape transportation speed was set as a value shown in Table 1. In Examples 2 to 8 and Comparative Examples 7 to 14, the TMR head which was the same as that in Example 1 was used as a servo head. In Comparative Examples 1 to 6, a commercially available spin valve type GMR head (element width of 70 nm) was used as a servo head. This GMR head was a magnetic head having a OP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results of the evaluations described above are shown in Table 1.

TABLE 1

|  | Example 1 | Example 2 | Example 3 | Example 4 | Example 5 | Example 6 | Example 7 | Example 8 |
|---|---|---|---|---|---|---|---|---|
| Magnetic layer thickness | 0.1 μm | 0.1 μm | 0.1 μm | 0.1 μm | 0.1 μm | 0.1 μm | 0.1 μm | 0.1 μm |
| Non-magnetic layer thickness | 1.5 μm | 1 μm | 1 μm | 0.5 μm | 0.5 μm | 0.3 μm | 0.3 μm | 0.3 μm |
| Total thickness of magnetic layer + non-magnetic layer | 1.6 μm | 1.1 μm | 1.1 μm | 0.6 μm | 0.6 μm | 0.4 μm | 0.4 μm | 0.4 μm |
| Colloidal silica average particle size | 120 nm | 80 nm | 80 nm | 80 nm | 80 nm | 40 nm | 40 nm | 40 nm |
| Calender temperature | 80° C. | 90° C. | 90° C. | 90° C. | 90° C. | 110° C. | 110° C. | 110° C. |
| Center line average surface roughness Ra | 2.8 nm | 2.0 nm | 2.0 nm | 2.0 nm | 2.0 nm | 1.5 nm | 1.5 nm | 1.5 nm |
| Ferromagnetic hexagonal barium ferrite powder (1) Average particle size | 25 nm | 25 nm | 25 nm | 25 nm | 25 nm | 25 nm | 25 nm | 25 nm |
| Amount used | 99.0% | 99.0% | 98.7% | 98.7% | 98.5% | 98.5% | 98.5% | 98.5% |
| Ferromagnetic hexagonal barium ferrite powder (2) Average particle size | 55 nm | 55 nm | 55 nm | 55 nm | 55 nm | 55 nm | 55 nm | 55 nm |
| Amount used | 1.0% | 1.0% | 1.3% | 1.3% | 1.5% | 1.5% | 1.5% | 1.5% |
| Base friction | 0.28 | 0.28 | 0.26 | 0.26 | 0.23 | 0.23 | 0.23 | 0.23 |
| Servo head | TMR | TMR | TMR | TMR | TMR | TMR | TMR | TMR |
| Magnetic tape transportation speed | 18 m/sec | 18 m/sec | 18 m/sec | 18 m/sec | 18 m/sec | 18 m/sec | 10 m/sec | 1 m/sec |
| Number of times of occurrence of decrease in resistance value (times) | 0 | 0 | 0 | 0 | 0 | 0 | 0 | 0 |
| Rate of decrease in resistance value (%) | 8 | 9 | 6 | 15 | 5 | 6 | 13 | 18 |

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Magnetic layer thickness | 0.1 μm | 0.1 μm | 0.1 μm | 0.1 μm | 0.1 μm | 0.1 μm | 0.1 μm |
| Non-magnetic layer thickness | 1.5 μm | 1.0 μm | 1.0 μm | 0.5 μm | 0.5 μm | 0.5 μm | 1.5 μm |
| Total thickness of magnetic layer + non-magnetic layer | 1.6 μm | 1.1 μm | 1.1 μm | 0.6 μm | 0.6 μm | 0.6 μm | 1.6 μm |
| Colloidal silica average particle size | 120 nm | 120 nm | 80 nm | 80 nm | 80 nm | 80 nm | 120 nm |
| Calender temperature | 80° C. | 90° C. | 90° C. | 80° C. | 90° C. | 90° C. | 80° C. |
| Center line average surface roughness Ra | 2.8 nm | 2.5 nm | 2.0 nm | 2.5 nm | 2.0 nm | 2.0 nm | 2.8 nm |
| Ferromagnetic hexagonal barium ferrite powder (1) Average particle size | 25 nm | 25 nm | 25 nm | 25 nm | 25 nm | 25 nm | 25 nm |
| Amount used | 100.0% | 100.0% | 100.0% | 100.0% | 100.0% | 100.0% | 100.0% |
| Ferromagnetic hexagonal barium ferrite powder (2) Average particle size | — | — | — | — | — | — | — |
| Amount used | — | — | — | — | — | — | — |
| Base friction | 0.45 | 0.45 | 0.45 | 0.45 | 0.45 | 0.45 | 0.45 |
| Servo head | GMR | GMR | GMR | GMR | GMR | GMR | TMR |
| Magnetic tape transportation speed | 18 m/sec | 18 m/sec | 18 m/sec | 18 m/sec | 18 m/sec | 1 m/sec | 19 m/sec |
| Number of times of occurrence of decrease in resistance value (times) | 0 | 0 | 0 | 0 | 0 | 0 | 0 |
| Rate of decrease in resistance value (%) | 0 | 0 | 0 | 0 | 0 | 0 | 0 |

|  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Magnetic layer thickness | 0.1 μm | 0.1 μm | 0.1 μm | 0.1 μm | 0.1 μm | 0.1 μm | 0.1 μm |
| Non-magnetic layer thickness | 1.5 μm | 1.0 μm | 1.0 μm | 0.5 μm | 0.5 μm | 0.3 μm | 1.0 μm |
| Total thickness of magnetic layer + non-magnetic layer | 1.6 μm | 1.1 μm | 1.1 μm | 0.6 μm | 0.6 μm | 0.4 μm | 1.1 μm |
| Colloidal silica average particle size | 120 nm | 120 nm | 80 nm | 80 nm | 80 nm | 40 nm | 80 nm |
| Calender temperature | 80° C. | 90° C. | 90° C. | 80° C. | 90° C. | 110° C. | 90° C. |
| Center line average surface roughness Ra | 2.8 nm | 2.5 nm | 2.0 nm | 2.5 nm | 2.0 nm | 1.5 nm | 2.0 nm |
| Ferromagnetic hexagonal barium ferrite powder (1) Average particle size | 25 nm | 25 nm | 25 nm | 25 nm | 25 nm | 25 nm | 25 nm |
| Amount used | 100.0% | 100.0% | 100.0% | 100.0% | 100.0% | 100.0% | 99.2% |
| Ferromagnetic hexagonal barium ferrite powder (2) Average particle size | — | — | — | — | — | — | 55 nm |
| Amount used | — | — | — | — | — | — | 0.8% |
| Base friction | 0.45 | 0.45 | 0.45 | 0.45 | 0.45 | 0.45 | 0.35 |
| Servo head | TMR | TMR | TMR | TMR | TMR | TMR | TMR |

TABLE 1-continued

| Magnetic tape transportation speed | 18 m/sec | 18 m/sec | 18 m/sec | 18 m/sec | 18 m/sec | 18 m/sec | 18 m/sec |
|---|---|---|---|---|---|---|---|
| Number of times of occurrence of decrease in resistance value (times) | 1 | 3 | 7 | 9 | 10 | 10 | 1 |
| Rate of decrease in resistance value (%) | — | — | — | — | — | — | — |

As shown in Table 1, in Comparative Examples 1 to 6 in which the GMR head was used as a servo head, the magnetic tape transportation speed was equal to or lower than 18 m/sec and, even in a case where the base friction of the magnetic tape exceeded 0.30, a significant decrease in resistance value of the servo head was not observed. In addition, in Comparative Example 7 in which the magnetic tape transportation speed exceeded 18 m/sec although the TMR head was used as a servo head, even in a case where the base friction of the magnetic tape exceeded 0.30, a significant decrease in resistance value of the servo head was not observed. On the other hand, in Comparative Examples 8 to 14 in which the TMR head was used as a servo head, the magnetic tape transportation speed was equal to or lower than 18 m/sec, and a case where the base friction of the magnetic tape exceeded 0.30, a significant decrease in resistance value of the servo head occurred.

With respect to this, in Examples 1 to 8 in which the TMR head was used as a servo head, the magnetic tape transportation speed was equal to or lower than 18 m/sec, and the base friction of the magnetic tape equal to or smaller than 0.30, it was possible to prevent a significant decrease in resistance value of the servo head (TMR head).

One aspect of the invention is effective for usage of magnetic recording for which high-sensitivity reproducing of information recorded with high density is desired.

What is claimed is:

1. A magnetic tape device comprising:
   a magnetic tape; and
   a servo head,
   wherein a magnetic tape transportation speed of the magnetic tape device is equal to or lower than 18 m/sec,
   the servo head is a magnetic head including a tunnel magnetoresistance effect type element as a servo pattern reading element,
   the magnetic tape includes a non-magnetic support, and a magnetic layer including ferromagnetic powder and a binding agent on the non-magnetic support,
   the magnetic layer includes a servo pattern, and
   a coefficient of friction measured regarding a base portion of a surface of the magnetic layer is equal to or smaller than 0.30.

2. The magnetic tape device according to claim 1,
   wherein the coefficient of friction measured regarding the base portion of the surface of the magnetic layer is 0.20 to 0.30.

3. The magnetic tape device according to claim 1,
   wherein a center line average surface roughness Ra measured regarding a surface of the magnetic layer is equal to or smaller than 2.8 nm.

4. The magnetic tape device according to claim 3,
   wherein the center line average surface roughness Ra is equal to or smaller than 2.5 nm.

5. The magnetic tape device according to claim 1,
   wherein the magnetic tape includes a non-magnetic layer including non-magnetic powder and a binding agent between the non-magnetic support and the magnetic layer, and
   a total thickness of the magnetic layer and the non-magnetic layer is equal to or smaller than 1.8 μm.

6. The magnetic tape device according to claim 5,
   wherein the total thickness of the magnetic layer and the non-magnetic layer is equal to or smaller than 1.1 μm.

7. A head tracking servo method comprising:
   reading a servo pattern of a magnetic layer of a magnetic tape by a servo head in a magnetic tape device,
   wherein a magnetic tape transportation speed of the magnetic tape device is equal to or lower than 18 m/sec,
   the servo head is a magnetic head including a tunnel magnetoresistance effect type element as a servo pattern reading element,
   the magnetic tape includes a non-magnetic support, and a magnetic layer including ferromagnetic powder and a binding agent on the non-magnetic support,
   the magnetic layer includes the servo pattern, and
   a coefficient of friction measured regarding a base portion of a surface of the magnetic layer is equal to or smaller than 0.30.

8. The head tracking servo method according to claim 7,
   wherein the coefficient of friction measured regarding the base portion of the surface of the magnetic layer is 0.20 to 0.30.

9. The head tracking servo method according to claim 7,
   wherein a center line average surface roughness Ra measured regarding a surface of the magnetic layer is equal to or smaller than 2.8 nm.

10. The head tracking servo method according to claim 9,
    wherein the center line average surface roughness Ra is equal to or smaller than 2.5 nm.

11. The head tracking servo method according to claim 7,
    wherein the magnetic tape includes a non-magnetic layer including non-magnetic powder and a binding agent between the non-magnetic support and the magnetic layer, and
    a total thickness of the magnetic layer and the non-magnetic layer is equal to or smaller than 1.8 μm.

12. The head tracking servo method according to claim 11,
    wherein the total thickness of the magnetic layer and the non-magnetic layer is equal to or smaller than 1.1 μm.

* * * * *